US010645167B2

United States Patent
Wallace

(10) Patent No.: US 10,645,167 B2
(45) Date of Patent: May 5, 2020

(54) DISTRIBUTED SETTING OF NETWORK SECURITY DEVICES FROM POWER SYSTEM IED SETTINGS FILES

(71) Applicant: Cybirical, LLC, Mandeville, LA (US)

(72) Inventor: Nathan S. Wallace, Mandeville, LA (US)

(73) Assignee: Cybirical, LLC, Mandeville, LA (US)

( * ) Notice: Subject to any disclaimer, the term of this patent is extended or adjusted under 35 U.S.C. 154(b) by 0 days.

(21) Appl. No.: 15/359,861

(22) Filed: Nov. 23, 2016

(65) Prior Publication Data
US 2017/0149734 A1 May 25, 2017

Related U.S. Application Data

(60) Provisional application No. 62/258,580, filed on Nov. 23, 2015.

(51) Int. Cl.
*H04L 29/08* (2006.01)
*H04L 29/06* (2006.01)

(52) U.S. Cl.
CPC .......... *H04L 67/12* (2013.01); *H04L 63/205* (2013.01); *Y04S 40/18* (2018.05); *Y04S 40/24* (2013.01)

(58) Field of Classification Search
CPC ............................ H04L 67/12; H04L 63/205
See application file for complete search history.

(56) References Cited

U.S. PATENT DOCUMENTS

| 7,761,910 | B2 * | 7/2010 | Ransom | G06F 1/28 726/6 |
| 9,755,896 | B2 * | 9/2017 | Nuqui | H04L 63/1441 |
| 2004/0117624 | A1 * | 6/2004 | Brandt | H04L 63/1408 713/166 |
| 2005/0283823 | A1 * | 12/2005 | Okajo | G06F 21/604 726/1 |
| 2007/0067132 | A1 * | 3/2007 | Tziouvaras | H02H 3/006 702/122 |
| 2008/0162930 | A1 * | 7/2008 | Finney | H04L 63/083 713/165 |

(Continued)

Primary Examiner — Michael Pyzocha
(74) Attorney, Agent, or Firm — Warner J. Delaune; Baker Donelson, et al.

(57) ABSTRACT

A system and method for improving the security and reliability of industrial control system (ICS) and supervisory control and data acquisition (SCADA) communication networks utilized within power systems is provided. For power system intelligent electronic devices (IEDs) that comprise these networks, a number of settings are created and stored inside the device settings files that define the IED's communication parameters. Inspection of a settings and configuration file (SCF) allows the identification and extraction of the device's configured and therefore permissible communication characteristics. Using this extracted information, rulesets are generated and subsequently pushed to one or more network security devices, e.g. firewalls, managed switches, and intrusion detection/prevention systems. In such a manner, the described innovation is able to derive a perspective of the allowable system communication and issue rulesets and settings to network security devices (NSDs). The NSDs are subsequently able to control communication links and/or detect deviations from the acceptable communication parameters as per the function and design of the NSD.

4 Claims, 4 Drawing Sheets

(56) References Cited

U.S. PATENT DOCUMENTS

| | | | | |
|---|---|---|---|---|
| 2008/0234872 A1* | 9/2008 | Vetter | ............... | G06F 17/2247 700/286 |
| 2010/0095348 A1* | 4/2010 | Foster | ............... | G06F 21/6236 726/1 |
| 2011/0282507 A1* | 11/2011 | Oudalov | ............... | H04B 3/54 700/292 |
| 2011/0307936 A1* | 12/2011 | Braendle | ............... | H04L 41/12 726/1 |
| 2012/0323381 A1* | 12/2012 | Yadav | ............... | H04L 63/0236 700/286 |
| 2013/0019276 A1* | 1/2013 | Biazetti | ............... | H04L 65/40 726/1 |
| 2014/0068629 A1* | 3/2014 | Boller | ............... | G06F 9/542 719/313 |
| 2014/0128999 A1* | 5/2014 | Schweitzer, III | ........ | G05B 9/02 700/79 |
| 2014/0143419 A1* | 5/2014 | Vyatkin | ............... | H02J 3/46 709/224 |
| 2015/0370235 A1* | 12/2015 | Lloyd | ............... | G05B 19/048 700/79 |
| 2016/0080425 A1* | 3/2016 | Cianfrocca | ......... | H04L 63/0227 726/1 |
| 2016/0344738 A1* | 11/2016 | Dotan | ............... | H04L 63/101 |

\* cited by examiner

DISTRIBUTED SETTING OF NETWORK SECURITY DEVICES FROM POWER SYSTEM IED SETTINGS FILES

CROSS-REFERENCE TO RELATED APPLICATIONS

This nonprovisional application claims the benefit of priority to U.S. provisional application Ser. No. 62/258,580, filed on Nov. 23, 2015.

STATEMENT REGARDING FEDERALLY SPONSORED RESEARCH OR DEVELOPMENT

Not applicable.

BACKGROUND OF THE INVENTION

1. Field of the Invention

The present invention relates to systems and methods for the cybersecurity of wired and wireless communication networks, intelligent electronic devices, and communication nodes contained within industrial control systems, specifically those utilized in the generation, transmission, and distribution of electric power.

2. Description of Related Art

The electrical power grid ensures the safe and reliable generation, transmission, and distribution of electrical power to the receiving loads. With the proliferation of inexpensive digital processing and communication devices allowing for increased monitoring and control, these devices are becoming integrated into all levels of the power grid, which relies on a class of technologies known as industrial control systems (ICS). Each ICS is comprised of one or more intelligent electronic device(s) (IED) and communication node(s) (CN). Examples of power system IEDs include protective relays, voltage controllers, automation controllers, and revenue meters. Examples of power system CNs include power line carrier technologies, remote terminal units (RTUs), managed switches, and security gateways. These technologies are often times manufactured, integrated, and supported by different entities over the lifespan of the device and of the physical system being controlled. Systems that utilize cyber mechanisms for the supervisory control and data acquisition (SCADA) of a physical system have more recently become known as cyber-physical systems (CPS).

Because some SCADA functionality is acquired through the utilization of information technology (IT), current CPS security solutions and network security devices (NSDs) rely on solutions that were originally designed for pure IT based environments where there was no control of physical devices. Consequently, the information utilized for the execution of a network security action may be derived from an incomplete picture of the physical system contained within the CPS. For instance, the network security action may not include the specific roll or function of the devices as it relates to the physical application (e.g. a meter vs a master controller).

IT based security technologies that are entering power system SCADA/CPS environments include: managed switches, firewalls, software defined networks (SDN), intrusion detection systems (IDS), and intrusion prevention systems (IPS). One or more of these technologies can be used independently or in combination to perform network security monitoring (NSM); where, the security of the communication links are monitored for violations against a set of signatures or rules. Such rules can be statically generated or behaviorally generated using techniques of knowledge discovery and datamining.

NSM can be performed using TCP/IP based communication. Some instances of NSM look at only the metadata of the communication packet; e.g. source and destination address, source and destination port, and timestamp. Other instances of NSM, such as deep packet inspection (DPI), will examine the information contained within the payload of the captured communication.

To ensure SCADA functionality, power system IEDs and CNs are designed to allow for formatted styles of communication via industry standard protocols including: Distributed Network Protocol (DNP3), Modbus, IEC 61850, and SEL amongst others.

SUMMARY OF THE INVENTION

An objective of this invention is to create a scalable and near seamless approach for securing distributed intelligent electronic devices (IEDs) and communication nodes (CNs) contained within automation, control, and protection networks of distributed electrical power systems. These objectives are achieved by creating a system that utilizes the knowledge stored in the IED's and CN's settings and configuration files (SCFs).

During the design and commissioning phase of electrical power communication, protection, and automation equipment an engineer must 'set' the IEDs and CNs according to the desired parameters as issued by design engineers and integrators. These parameters are stored in SCFs and as such describe how the IEDs and CNs are to communicate and perform the desired operations.

According to the invention, upon the utilization of a processor coupled with memory (e.g. computer) to analyze the SCFs located in a computerized storage medium (e.g. database), rules are created that describe the permissible communication features issued by the design engineer and subsequently set forth by the commissioning engineer. These rules then can be issued locally or remotely over a communication medium to one or more network security devices (NSDs). The NSD is then able to initiate any number of security actions based on the receipt of the rule(s) and according to the function of the NSD.

In some embodiments, upon receipt of the rules the NSD may create communication channels, including virtualized or non-virtualized, providing a secure means of communication between the nodes whose rules are being issued. This includes technologies such as managed switches and software defined networks.

In some embodiments, the NSD will according to its desired function utilize the issued rules in a manner that is able to determine observed behavioral violations in the information traversing wired and or wireless communication links between power system IEDs and CNs. In such an embodiment the NSD will be able to send, log, and/or otherwise signal upon detected violations of the issued rulesets. The transmission of an alert (ruleset violation) from the NSD may utilize communication networks and protocols, encrypted or not, comprising the SCADA environment. Additionally, such an alert (ruleset violation) may be configured to trigger the closing or opening of an electrical contact to connected nodes as is customary in power system control and alarming environments.

In some embodiments, a processor coupled with memory (e.g. computer) will be added to collect and analyze the alerts from one or more NSDs and present the information in human readable fashion via a human machine interface (HMI). It may also send the information in a formatted manner to another processor for additional processing or for system wide logging and further analyses of security events.

Accordingly, a system for the distributed security setting and monitoring of communication links between power system intelligent electronic devices (IEDs) and communication devices is provided, comprising: (a) a computerized storage medium containing a configuration file of one or more nodes in a control network; (b) a first processor coupled to a first memory in the control network configured to read a node's configuration file contained within the computerized storage medium, identify the node's permissible communication features from those files, create security rulesets derived from the identification of permissible communication parameters, and issue and subsequently distribute created rulesets to one or more network security devices; (c) a second processor coupled to a second memory in the control network functioning as a network security device configured to receive issued security rulesets, receive communication between the nodes of the control network, and utilize the received issued security rulesets to perform selected functions, wherein the selected functions may comprise: (i) establishing acceptable non-virtualized or virtualized communication channels for device communication; (ii) detecting violations of the issued rulesets; and (iii) issuing alerts upon a detected violation of the issued rulesets.

The invention may further comprise a third processor coupled to third memory in the control network, wherein the third processor is configured to: i. receive, process, and store alerts from one or more of the distributed network security devices; ii. display alerts in a human readable fashion; and iii. send a formatted alert to a centralized security location.

The invention may be further be practiced wherein the created rulesets comprise a node's permissible contextual communication features including those selected from the group comprising: (a) protocol; (b) source and destination address; (c) address subnet mask; (d) source and destination port; (e) command instructions; (f) protocol point maps; (g) data types; and (h) value ranges.

The invention may be further be practiced wherein the network security device performs selected functions, and wherein the selected functions may comprise: (a) stateless analysis based on observed contextual information; (b) statefull analysis based on observed contextual information; (c) deep packet inspection; and (d) port mirroring.

The invention may be further be practiced wherein the issuing of generated rulesets utilize communication networks and protocols, encrypted or not, within a SCADA environment.

The invention may be further be practiced wherein the alarming of ruleset violation is executed via: (a) utilization of communication networks and protocols, encrypted or not, within the SCADA environment; and (b) closing or opening of electrical alarming contacts directly wired to one or more control system nodes.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF PREFERRED EMBODIMENTS

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
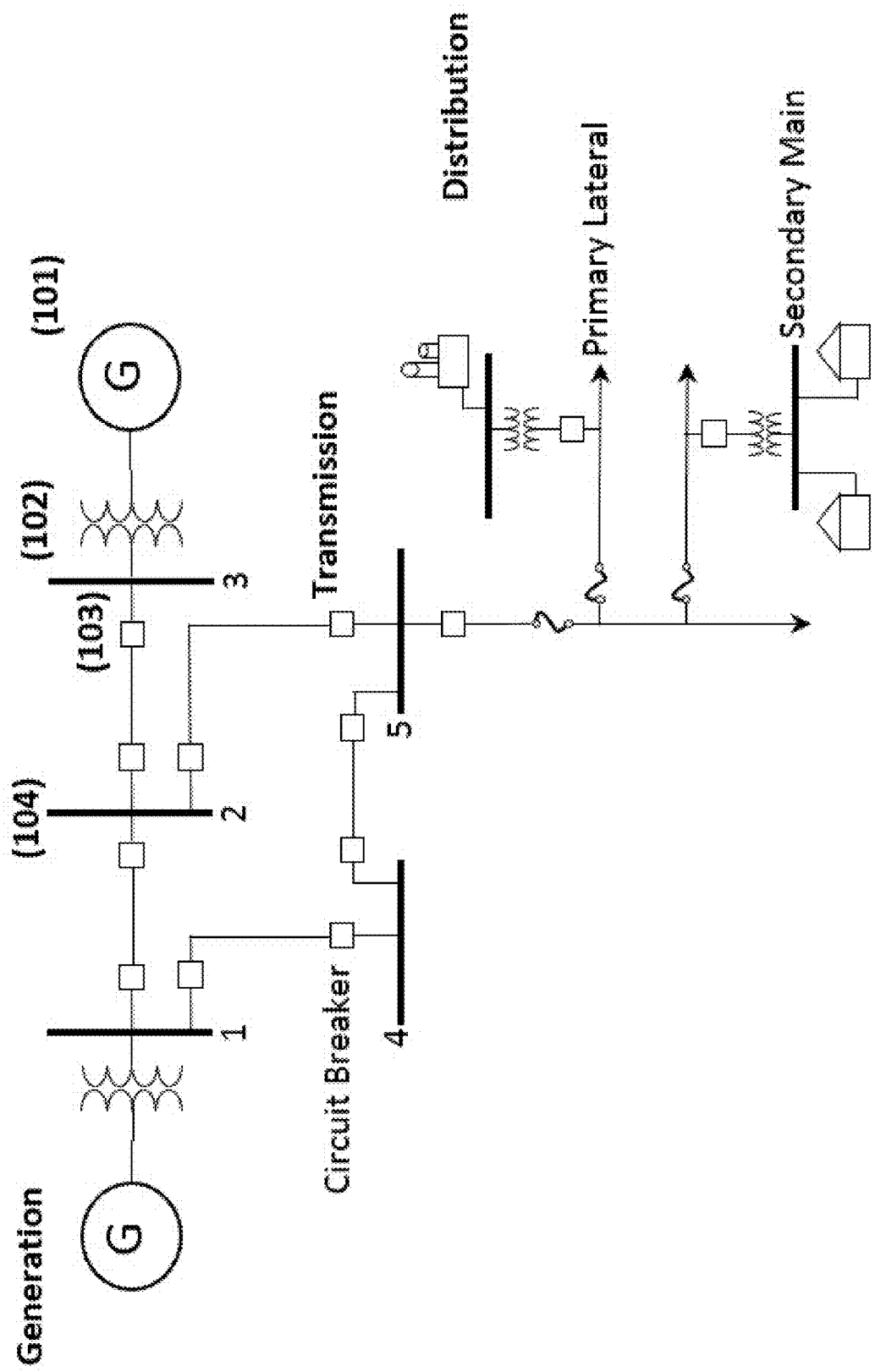
FIG. 1 is a generic power system comprised of a generation system, a transmission system, and a distribution system.
Figure 2:
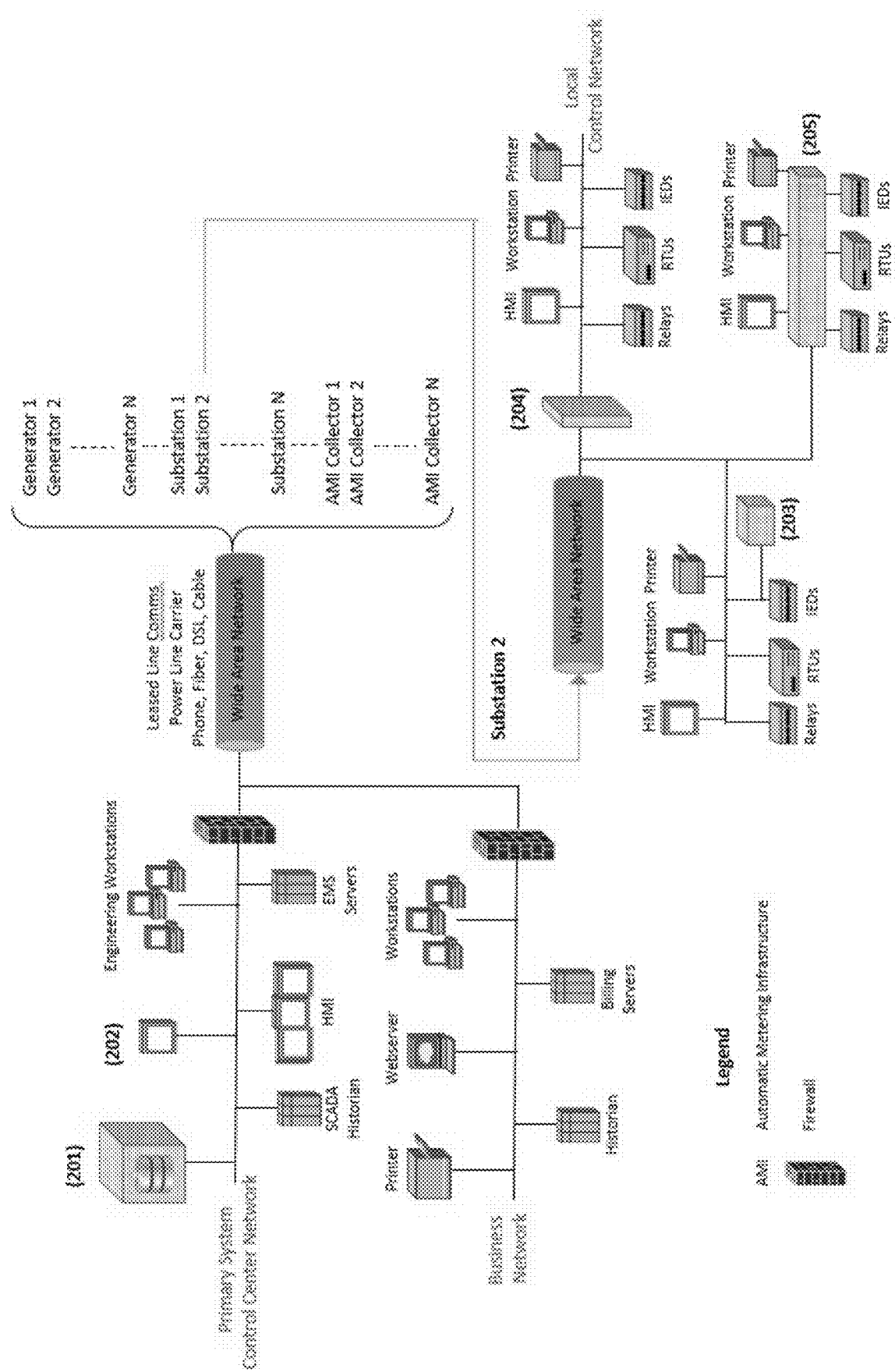
FIG. 2 shows a generic control and monitoring communication infrastructure for an electric utility.

Turning now to FIG. 1, generation, transmission, and distribution stations and systems are geographically distributed across wide areas contained within an electric utility's service area. As shown in FIG. 2, for the average utility there is a Primary System Control Center Network which communicates over some wide area network via private or leased lines to multiple remote sites. For a utility comprised of N Substations, there are 1 to N intelligent electronic device (IEDs) located within each electrical substation. This embodiment of the invention is comprised of placing a device (201) at the primary control where the settings and configuration files (SCFs) of each IED are stored. A processor will analyze and create rules based on the information stored in the SCFs and issue those rules to the appropriate network security devices (NSDs) (204),(203), (205).

Figure 3:
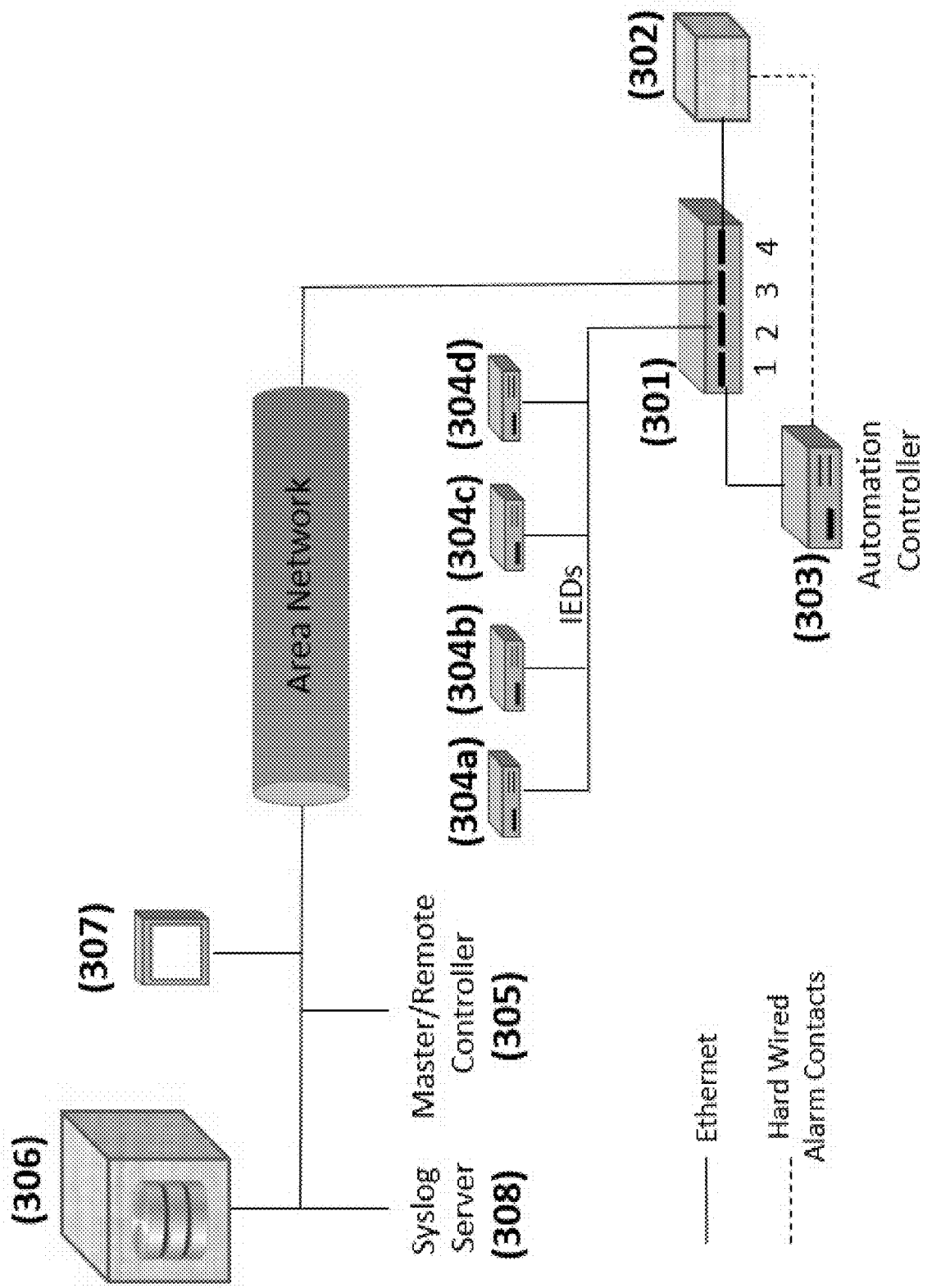
FIG. 3 shows an example embodiment of the innovation.

An example of this embodiment is further described in FIG. 3, and includes a total of five intelligent electronic devices, including the Automation Controller (303), one managed switch (301), and the NSD (302). A Master Controller (305) functioning as a remote controller of the substation is able to perform remote monitoring and control of substation equipment via the Automation Controller (303). A database of the SCFs for each device along with the processor to analyze those files is described as (306). Contained within each IEDs (304a), (304b), (304c), (304d) are SCF parameters that describe, where applicable, the following four categories of communication parameters:

1. What other node(s) the IED or communication node (CN) is designed to communicate with. For TCP/IP based communication this may include the source and destination IP and MAC addresses along with the source and destination protocol ports.
2. Designated protocol used for that communication channel. Examples include: MODBUS, DNP3, IEC 61850, SEL, amongst others.
3. Type of communication (e.g. polled, solicited, unsolicited) used within the confines of the protocol.
4. Protocol point maps within that communication protocol. Point maps include the values and data types mapped to the payload of the information traversing the medium according to the protocol selected.

Each IED (304a), (304b), (304c), (304d) is set to communicate with the Automation controller (303); while, only the Automation controller (303) is set to communicate to the master/remote controller (305). For direct transfer trip (DTT) relay protection schemes IEDs (304b) and (304c) are designed to communicate with each other. The managed switch (301) is set to mirror all communication observed on ports 1, 2, and 3 to the NSD (302) located on port 4. Also, IEDs (304a), (304b), and (304c) are all protective relays designed to trip a breaker; while IED (304d) is a revenue meter that collects and aggregates the power system readings and sends them via solicited communication to automation controller (303).

Figure 4:
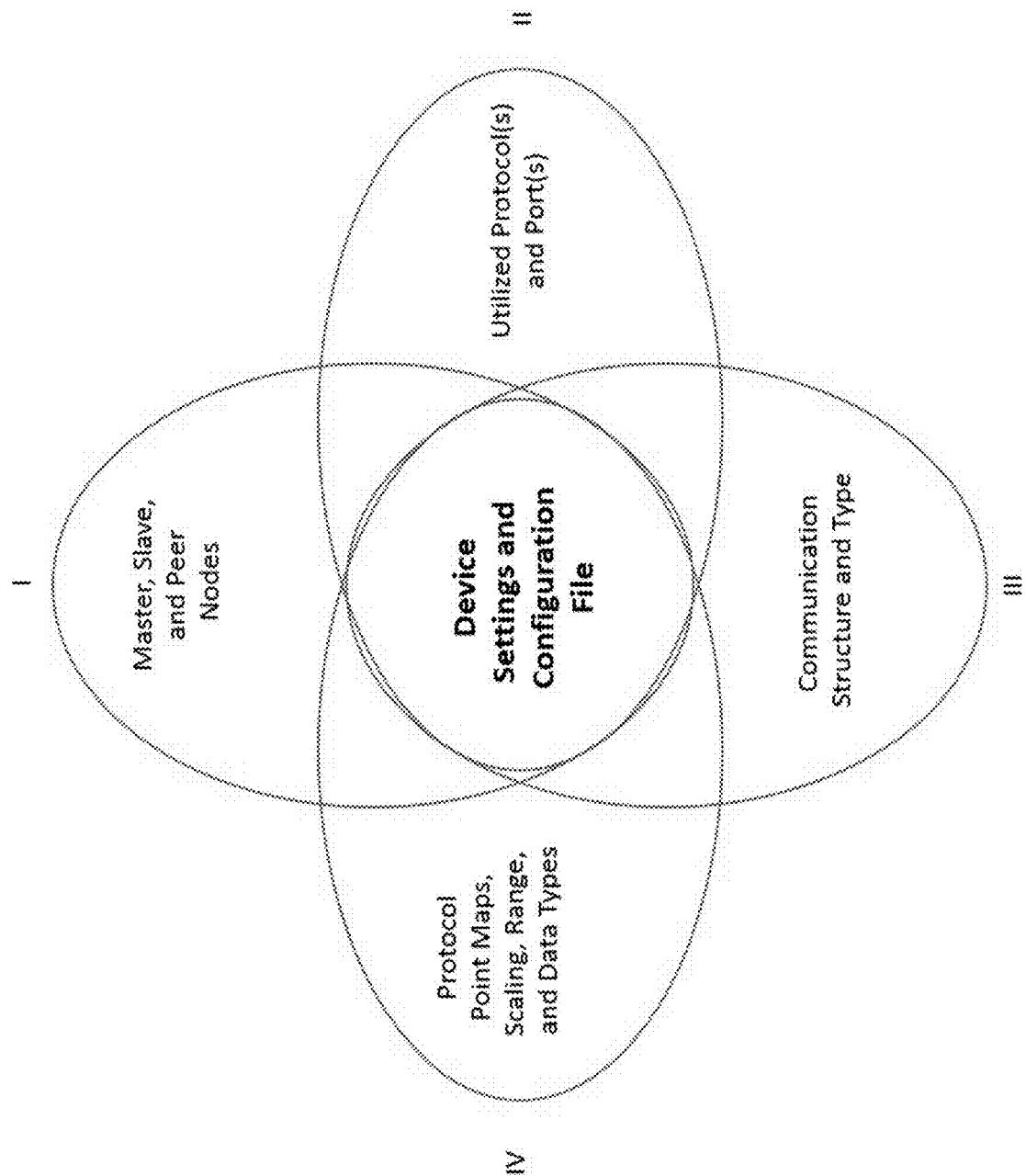
FIG. 4 shows the four main categories of information extracted from the settings and configuration files (SCFs) of each IED and CN.

Once commissioned, device (306) begins to analyze the SCFs for each device to create rules based on the information stored in those files according to the four categories shown in FIG. 4. Once all IEDs under the protection of device (302) have been analyzed by (306), device (306) will then send rules via the communication infrastructure to the remote substation where device (302) is positioned to capture all traffic. Device (302) will then acknowledge receipt of the rules and load the rules into internal memory for comparison against captured communication network events. When a network event is found to violate an issued rule, device (302) closes an electrical contact sending an alarm to device (303). Additionally, device (302) will send an alarm message over the communication infrastructure to a cyber security annunciator (CSA) (307). Contents of the alarm message include a description of what rule was violated and a timestamp stating when the rule was violated. The CSA (307) will then perform any additional processing of the alarm message in order to display it in a human readable format. Additionally, the CSA (307) may send a formatted event log to a Syslog server (308) for additional security logging and retrieval.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together, may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only, and the scope of the present invention is to be limited only by the following claims.

The invention claimed is:

1. A system for distributed security setting and monitoring of communication links between power system intelligent electronic devices (IEDs) and communication devices comprising:
    (a) a computerized storage medium containing a configuration file of one or more nodes in a control network;
    (b) a first processor coupled to a first memory in the control network configured to read a node's configuration file contained within the computerized storage medium, identify the node's permissible communication features from those files, create security rulesets derived from the identification of permissible communication parameters, and issue and subsequently distribute created rulesets to one or more network security devices;
    (c) a second processor coupled to a second memory in the control network functioning as a network security device configured to receive issued security rulesets, receive communication between the nodes of the control network, and utilize the received issued security rulesets to perform selected functions, wherein the selected functions comprise:
        (i) establishing acceptable non-virtualized or virtualized communication channels for device communication;
        (ii) detecting violations of the issued rulesets affecting the IEDs, wherein the IEDs comprise one or more protective relays, voltage controllers, automation controllers, and revenue meters, sufficient to cause a change in operation of the IEDs; and
        (iii) issuing alerts upon a detected violation of the issued rulesets; and
    (d) a third processor coupled to third memory in the control network, wherein the third processor is configured to:
        (i) receive, process, and store alerts from one or more of the distributed network security devices;
        (ii) display alerts in a human readable fashion; and
        (iii) send a formatted alert to a centralized security location;
    wherein the alerting of ruleset violation is executed via utilization of communication networks and protocols, encrypted or not, within a SCADA environment; and closing or opening of electrical alarming contacts directly wired to one or more control system nodes.

2. The system according to claim 1, wherein the created rulesets comprise a node's permissible contextual communication features including those selected from the group comprising:
    (a) protocol;
    (b) source and destination address;
    (c) address subnet mask;
    (d) source and destination port;
    (e) command instructions;
    (f) protocol point maps;
    (g) data types; and
    (h) value ranges.

3. The system according to claim 1, wherein the network security device performs selected functions, and wherein the selected functions comprise:
    (a) stateless analysis based on observed contextual information;
    (b) statefull analysis based on observed contextual information;
    (c) deep packet inspection; and
    (d) port mirroring.

4. The system according to claim 1, wherein the issuing of generated rulesets utilize communication networks and protocols, encrypted or not, within a SCADA environment.

* * * * *